Oct. 29, 1963   A. A. DUNKERLEY   3,108,365
TOOL FOR INSERTING BEARING INSERTS
Filed July 18, 1960   2 Sheets-Sheet 1
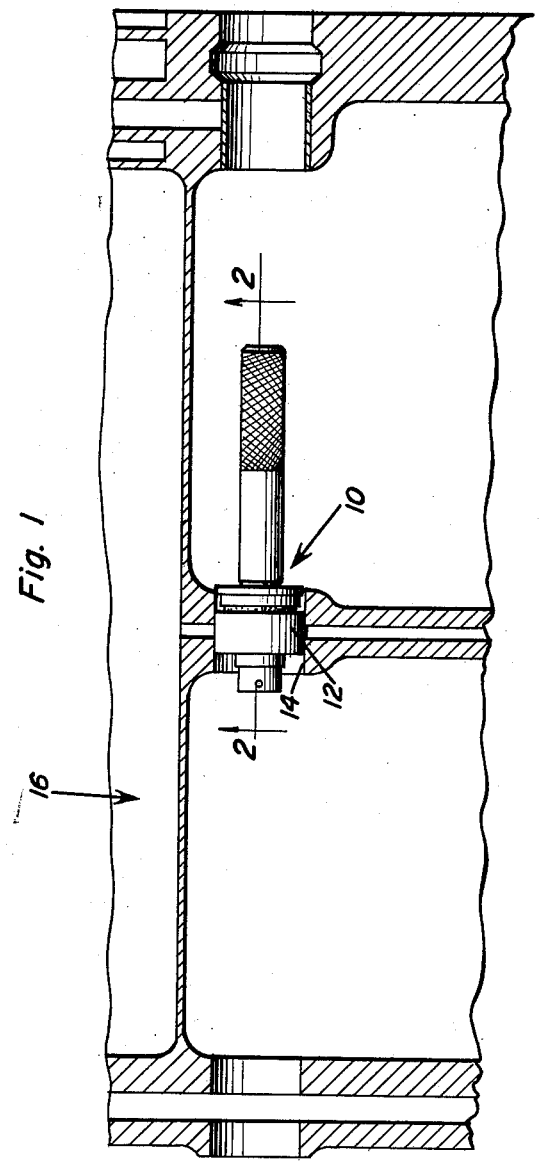
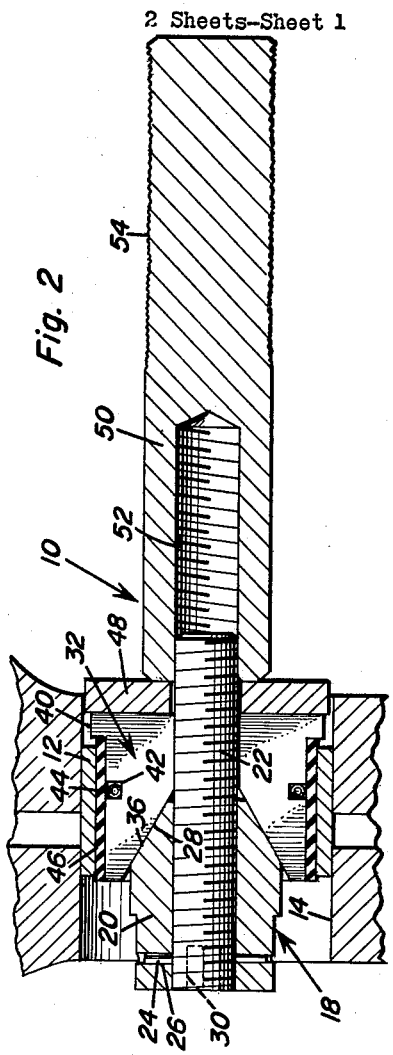
Arthur A. Dunkerley
INVENTOR.
BY *Clarence A. O'Brien*
and *Harvey B. Jacobson*
Attorneys

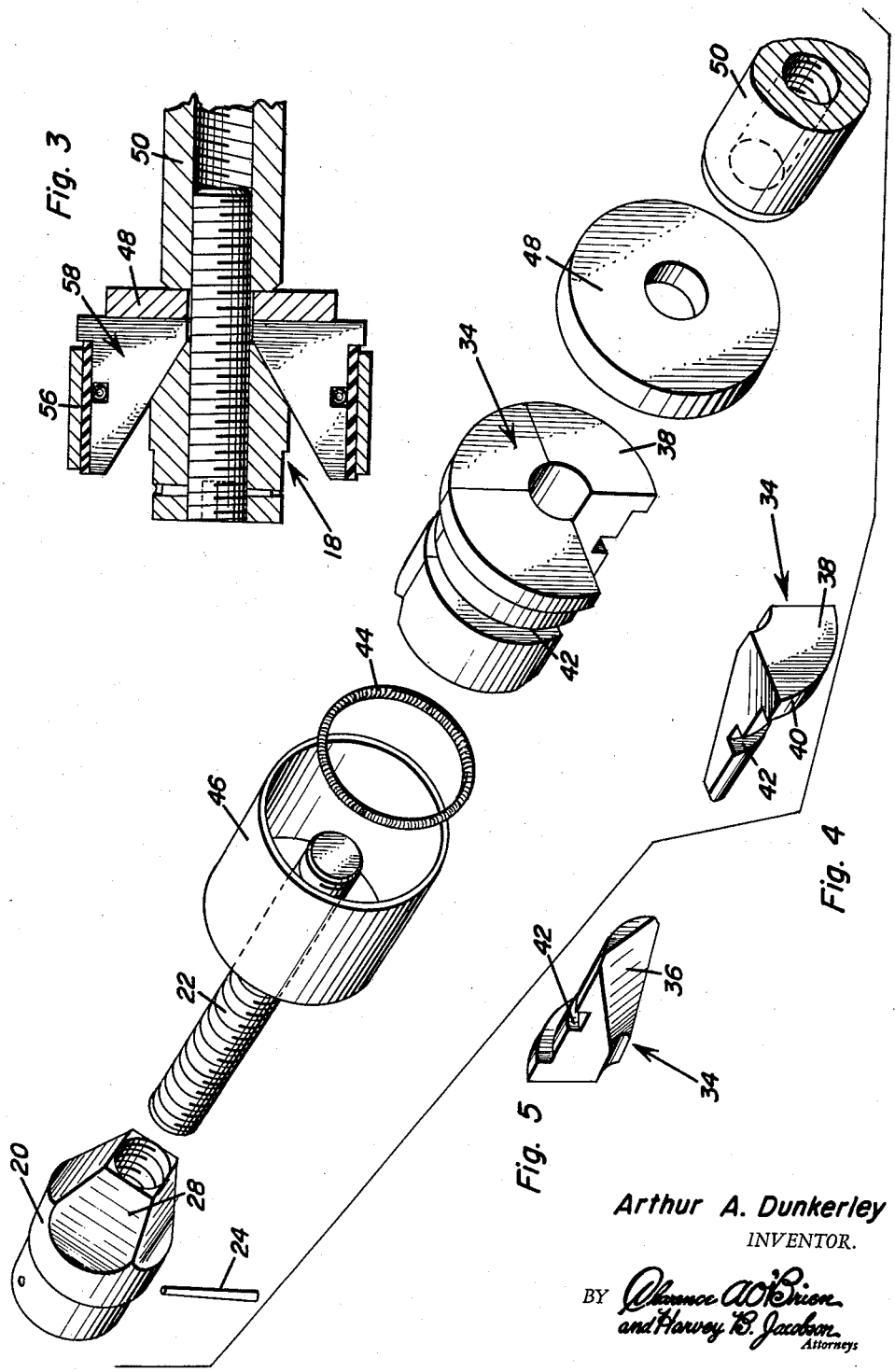

United States Patent Office 3,108,365
Patented Oct. 29, 1963

3,108,365
TOOL FOR INSERTING BEARING INSERTS
Arthur A. Dunkerley, 1413 Campus Road,
Los Angeles 42, Calif.
Filed July 18, 1960, Ser. No. 43,623
6 Claims. (Cl. 29—280)

This invention relates in general to new and useful improvements in tools for inserting bearing inserts into a journal bore and in particular is concerned with the installation of bearing inserts for the cam shaft bearing in internal combustion engines. This invention accordingly relates to my prior U.S. Patent No. 2,899,741.

It is therefore a primary object of this invention, to provide a tool for inserting or removing of bushing inserts which may be accomplished in a more rapid and accurate manner than was heretofore possible.

A further object of this invention is to provide apparatus capable of performing the above noted functions by means of a tool having a minimum of parts and yet capable of accommodating bushing inserts of various sizes.

The tool made in accordance with this invention therefore, includes a bearing insert pilot assembly of the radial expandable type which is positioned on and engageable with an expander nut member which cooperates with a clamp device to effect controlled radial expansion of the pilot device to thereby center the bearing insert positioned on the pilot device within the journal bore. The clamp device is actuated by means of a knurled shaft threadedly engaged with the expander device for axially applying pressure to a clamp disk which is engageable with the pilot device to cause the pilot device to expand radially as it reacts against the expander nut member. The tool, however, also features an annular rubber like tubing section which is positioned on the pilot device between the pilot device and the bushing insert assembled thereon so that the tubing section may not only protect the inner bearing surface of the bushing insert but also maintain both radial and axial conformity of the pilot device with the bushing insert. The bushing insert assembled on the tool as hereinabove indicated may then be inserted into the journal bore and upon rotatable actuation of the knurled shaft of the clamp device, the pilot device may be radially expanded so as to properly axially center and coaxially align the bushing insert within the journal bore.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary sectional view taken through an engine block showing the bearing insert tool in use for installing the center cam shaft bearing.

FIGURE 2 is an enlarged sectional view taken through a plane indicated by section line 2—2 in FIGURE 1.

FIGURE 3 is a fragmentary sectional view similar to the showing of FIGURE 2 but including a pilot device for accommodating a different size bearing insert.

FIGURE 4 is a perspective view of the disassembled part of the tool made in accordance with this invention.

FIGURE 5 is a perspective view of one of the segmental elements of the pilot device.

Referring now to the drawings in detail, the tool generally indicated by reference numeral 10 is shown in FIGURE 1 in its position for installing a bearing insert 12 within the journal bore 14 for journaling the cam shaft of an internal combustion engine generally indicated by reference numeral 16. It will therefore be apparent that the tool 10 with the bearing insert 12 assembled thereon may be inserted into the journal bore 14 for installing the bearing insert or the tool 10 may be inserted into the bearing insert 12 already installed within the journal bore 14 for removal of the bearing insert.

Referring now to FIGURES 2 and 4 in particular, it will be observed that the tool 10 includes an expander device generally indicated by the reference numeral 18. The expander device includes a nut member 20 which is threadedly engaged with one end of a threaded shaft 22 with a snug fit so as to fix the nut member 20 on the shaft 22. A tapered connecting pin 24 which is inserted through a complementary tapered radial bore 26 and an aligned aperture within the threaded shaft member 22, also provides additional means for fixedly attaching the nut member 20 to the threaded shaft 22. It will also be observed that at one end of the nut member 20 there are provided a plurality of inclined flat surfaces 28, four of such flat surfaces being provided for purposes of this description only. The flat inclined surfaces 28 serve the purposes as will hereafter be explained. It will also be observed in FIGURE 2 that the end of the threaded shaft 22 is provided with a squared socket 30 by means of which an Allen type wrench may be inserted for removing the threaded shaft 22 from the expander nut 20 when replacement of the threaded shaft is needed.

The pilot device generally indicated by reference numeral 32 is axially positioned on the threaded shaft 22 for engagement with the expander device 18 at one axial end of the pilot device 32. As will be more clearly seen in FIGURE 4, the pilot device comprises a plurality of segmental elements 34, four of which are shown. These segmental elements 34 are radially expandable with relation to the shaft 22 in order to center and align the bearing insert 12. Each of the segmental elements is therefore provided with a flat inclined surface 36 as more clearly seen in FIGURE 5, which is complementary with a flat surface 28 on the expander nut member 20 for engagement therewith as more clearly seen in FIGURE 2. At the other axial end of each segmental element 34 there is provided a clamp engaging surface 38 which also forms one side of a shoulder 40 formed at the clamp end of the pilot device 32. The purpose for the shoulder 40 will become apparent hereafter. It will also be observed that a groove 42 is formed within the outer surface of each of the segmental elements 34 intermediate the axial ends thereof, so that the assembled elements 34 will form an annular groove for accommodating an annular coil spring element 44 provided for the purpose of controlling the radial expansion of the segmental elements 34 of the pilot device 32, said spring element 44 tending to radially contract the pilot device, and also maintain radial conformity of the pilot device with respect to the inner bearing surface of the bearing insert 12 by defining a continuous curvature to which the segments are restricted despite non-uniform radial expansion because of non-parallel deviation between the bushing and journal bore.

In order to protect the inner bearing surface of the bearing insert 12 and also maintain axial conformity of the pilot device 32 with respect to the bearing insert as well as to help maintain its radial conformity, a tubing section 46 is provided, said tubing section being made of any suitable yieldable material such as rubber. It will be observed therefore, that the tubing section 46 circumferentially engages the outer surfaces of the segmental elements 34 by axially extending between the expander end and the shoulder 40 of each of the segmental elements 34 of the pilot device 32. Accordingly, the tubular section 46 will also enclose the annular spring element 44 assembled within the annular groove formed by the groove 42 on each of the segmental elements 34 as will be seen in FIGURE 2. It will therefore be apparent that by interposing the tubular section 46 between the outer surfaces of the pilot device elements and the inner bearing surface of the bearing insert 12, said inner bearing surface will be protected from the annular coil spring element 44 and any shifting of the elements 34 of the pilot device which may mar the inner bearing surface as a result thereof.

In order to cause radial expansion of the pilot device 32 axial pressure must be applied to the pilot device so that the flat surfaces 36 of the elements 34 thereof may react against the inclined flat surfaces 28 on the expander nut member to cause the radial expansion. A clamp disk 48 is therefore provided which is loosely positioned on the shaft 22 and abuts against the clamping surfaces 38 of the segmental elements 34 of the pilot device 32. The clamp disk 48 is therefore of such diameter as to clear the journal bore within which the tool is inserted. In order to apply the clamping pressure to the pilot device 22 by means of the clamp disk 48, an actuating shaft 50 is provided and includes an internal threaded bore 52 by means of which the shaft 50 is threadedly engaged with the end of the threaded shaft 22 opposite the expander nut member 20. The actuating shaft 50 also includes a knurled section 54 for facilitating its manipulation. It will therefore be apparent that upon rotation of the shaft 50 after the tool has been inserted into the journal bore 14 with the bearing insert 12 assembled thereon, the shaft 50 will be axially displaced relative to the threaded shaft 22 by virtue of its operative threaded engagement therewith. Accordingly, the axial displacement of the shaft 50 may apply axial pressure on the clamp disk 48 for the purpose of radially expanding the pilot device 32 into engagement with the bushing insert and axially displacing the insert for centering alignment within the journal 14 as hereinbefore indicated.

Referring now to FIGURE 3 it will be observed that the tool may in accordance with this invention accommodate various sizes of bearing inserts such as a bearing insert 56 which is of greater diameter than the bearing insert 12 illustrated in the other figures of the drawing. Accordingly, a different size pilot device 58 is provided which cooperates in the same manner with the expander device 18 and clamp disk 48 of the tool as described with respect to the other figures of the drawings. It will therefore be apparent that the clamp disk 48 is of such dimension so as to clear the smallest journal bore for which it is contemplated the tool will be used.

From the foregoing description operation and utility of the tool made in accordance with this invention will be apparent to those skilled in the art. Thus, a bushing necessarily having a sliding friction fit within the journal bore 14 is placed on the tubing section 46 enclosing the pilot device 32 of the tool 10 for insertion into said journal bore. Once roughly positioned or started therein, rotation of the knurled section will axially shift the pilot device by small amounts carrying the bushing thereon for axial centering purposes. At the same time, the segments 32 expand radially into tighter but non-uniform pressure engagement with the bushing, since a circumferential deviation may exist between the bushing and the journal bore surfaces, tending to deform the bushing without elongation, so as to obtain parallelism between the bushing and the journal bore for coaxial alignment purposes. Coaxial alignment will also facilitate axial centering movement which would otherwise be restricted by high localized surface friction between the bushing and journal bore resulting from non-parallel deviations in the confronting surfaces of the bushing and journal bore. It will therefore be appreciated that the tool aside from the economic advantage of using a minimum of parts, is also capable of inserting bearing inserts into various size installations with unexpected ease and accuracy.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and changes may be resorted to, falling within the scope of the invention as claimed.

What is claimed as new is as follows:

1. A tool for installing and removing bearing bushings comprising, threaded shaft means, expander means axially and rotatively fixed to one end of said shaft means, expandable pilot means mounted on said shaft means for radial and axial movement with respect to said expander means, clamp means slidably mounted on the other end of said shaft means in axial engagement with said pilot means for radially expanding and axially displacing said pilot means in cooperation with said expander means to accurately position a bushing insert, expansion control means engageable with said pilot means tending to radially contract said pilot means and maintain radial conformity thereof with said bushing insert, and bushing surface protective means enclosing said pilot means for maintaining radial and axial conformity thereof with the bushing insert, said clamp means comprising a clamp disk axially positioned on said shaft means adjacent said other end thereof for engagement with said pilot means and a rotatable clamp control shaft threadedly engaged with said other end of the shaft means for applying axial pressure on the clamp disk at a high mechanical advantage, said pilot means comprising a plurality of arcuate segmental elements each having an inclined flat surface at one axial end engageable with said expander means and a clamp engaging surface at the other axial end, and a positioning shoulder at said other axial end for axially positioning said bushing surface protective means on the pilot means.

2. The tool as defined in claim 1, wherein said expansion control means comprises an annular spring element seated within an annular groove formed within said pilot means intermediate its axial ends to confine said segmental elements to a continuous curvature.

3. The tool as defined in claim 2, wherein said bushing surface protective means comprises a continuous section of yieldable tubing circumferentially engageable with the pilot means in enclosing relation to said expansion control means and extending axially between said one axial end and the shoulder of the pilot means.

4. The tool as defined in claim 3, wherein said expander means comprises a nut member threadedly engaged with said shaft means with a snug fit and having a plurality of inclined flat surfaces which are engageable with the pilot means.

5. A tool for installing and removing bearing bushings comprising, threaded shaft means, expander means axially and rotatively fixed to one end of said shaft means, expandable pilot means mounted on said shaft means for radial and axial movement with respect to said expander means, clamp means slidably mounted on the other end of said shaft means in axial engagement with said pilot means for radially expanding and axially displacing said pilot means in cooperation with said expander means to accurately position a bushing insert, expansion control means engageable with said pilot means tending to radially contract said pilot means and maintain radial conformity thereof with said bushing insert and bushing surface protective means enclosing said pilot means for maintaining radial and axial conformity thereof with the bushing insert, said pilot means comprising a plurality of arcuate segmental elements each having an inclined flat surface at one axial end engageable with said expander means and a clamp engaging surface at the other axial end, and a shoulder at said other axial end for axially positioning said bushing surface protective means on the pilot means.

6. The tool as defined in claim 5, wherein said bushing surface protective means comprises a continuous section of yieldable tubing circumferentially engageable with the pilot means in enclosing relation to said expansion control means and extending axially between said one axial end and the shoulder of the pilot means.

References Cited in the file of this patent

UNITED STATES PATENTS

| | | |
|---|---|---|
| 1,448,528 | Elliott | Mar. 13, 1923 |
| 1,476,983 | King | Dec. 11, 1923 |
| 2,124,039 | Mitchell et al. | July 19, 1938 |
| 2,226,078 | Spahn | Dec. 24, 1940 |
| 2,366,467 | Anderson | Jan. 2, 1945 |
| 2,847,752 | Simmons | Aug. 19, 1958 |
| 2,899,741 | Dunkerley | Aug. 18, 1959 |